United States Patent [19]

Jinich et al.

[11] Patent Number: 4,885,798
[45] Date of Patent: Dec. 5, 1989

[54] POWER CONSUMPTION CONTROL APPARATUS

[75] Inventors: Leon Jinich; Karl R. Varian, both of Plano, Tex.

[73] Assignee: Rockwell International Corporation, El Segundo, Calif.

[21] Appl. No.: 246,023

[22] Filed: Sep. 14, 1988

Related U.S. Application Data

[63] Continuation of Ser. No. 7,854, Jan. 28, 1987, abandoned.

[51] Int. Cl.$^4$ .......................... H04B 7/02; H04B 15/00
[52] U.S. Cl. ........................................... 455/52; 455/69
[58] Field of Search .................. 455/49, 50, 52, 63, 455/68, 69; 330/127, 129, 130, 133, 134, 138, 141, 142

[56] References Cited

U.S. PATENT DOCUMENTS

| | | | |
|---|---|---|---|
| 3,745,464 | 7/1973 | Lee | 455/69 |
| 3,925,782 | 12/1975 | Anderl et al. | 455/69 |
| 4,004,224 | 1/1977 | Arens et al. | 455/52 |
| 4,547,746 | 10/1985 | Erickson et al. | 330/129 |
| 4,602,218 | 7/1986 | Vilmur et al. | 330/129 |
| 4,636,741 | 1/1987 | Mitzlaff | 330/127 |

FOREIGN PATENT DOCUMENTS

0035569 3/1980 Japan ........................................ 455/69

Primary Examiner—Gerald Brigance
Assistant Examiner—Richard Hjerpe
Attorney, Agent, or Firm—Bruce C. Lutz; V. Lawrence Swell; H. Fredrick Hamann

[57] ABSTRACT

In some applications of power amplifiers, a prescribed or given amount of distortion is permissible under many operational conditions, as long as lesser amounts of distortion are available upon command. It has been ascertained as a part of the present invention that, by reducing the bias current in one or more of the output stages of a power amplifier, acceptable distortion specifications can be maintained under conditions of low power consumption and low output power requirements while retaining the ability to have more demanding linearity requirement specifications by increasing the bias current to a more linear portion of the I-V (current-voltage) curve and optionally providing increased output signal power. The bias condition of reduced power results in a conservation of electrical power requirements, a reduction of heat and temperature problems within the amplifier enclosure and accordingly an increase in component life and circuit reliability. An environment where such an amplifier finds useful application is in a communication system having the potential for signal fading between transmitter and receiver wherein a potential solution is to increase signal power output from the transmitter in a signal fading condition.

2 Claims, 4 Drawing Sheets

A    B    C

POWER CONSUMPTION CONTROL APPARATUS

This is a continuation of application Ser. No. 007,854, filed Jan. 28, 1987, now abandoned.

THE INVENTION

The present invention is generally related to electronics, and more specifically, to communication systems. Even more specifically, the invention is related to an amplifier which operates under reduced power requirements during normal signal transmission conditions and operates under increased power consumption and power output during signal fading conditions.

BACKGROUND

One prior art approach to the problem of signal fading is to operate a transmitter portion of a communication link at full power consumption to deliver the required linearity of the received system signal under almost any circumstances. When conditions exist that fading of the signal occurs, the power received at the receiving end of the communication link will drop. When the error rate, quality or integrity of the received signal becomes low enough, a service channel in the communications system will alarm the transmitter to either switch to a standby power amplifier, or to change signal frequency channels in the hope that other frequencies are not as affected by the conditions causing the fading. Otherwise, there will be a loss of communication traffic.

Another prior art approach has been to provide an automatic power control, whereby either different amplifier circuits are switched in and out of operation between normal and fading conditions instead of switching to a standby power amplifier or to change signal frequency channels.

The present invention changes the bias level voltage to one or more of the output amplification stages in the transmitter power amplifier such that the output stages are operated in the less linear region (and at accordingly lower power consumption rate) under normal conditions. Under such normal conditions, a receiver can tolerate a lower quality signal, because there is adequate power being received. Then, when fading is detected, the transmitter is requested to increase the output power. In the present system, this increase in power is obtained by returning the bias of the output stages to a more linear amplification area. A more distortion free signal obtained at normal high power levels overcomes the effects of fading and if fading continues, the signal can be increased even more. The signal then becomes more non-linear again to get even more power out.

The present concept can be applied to raise the bias voltage above the normal design level whereby if fading continues, the signal power output can be increased even more. At this increased power level, the linearity of the signal again decreases, but under some operational conditions, the non-linearity may be less important than the desirability of an increased amount of output power.

The operation of the amplifiers at lower RF power levels during normal conditions creates less channel interference, and even further improves system operation over the prior art approach used by the present assignee.

It is accordingly an object of the present invention to provide an improved automatic power control system.

Other objects and advantages may be ascertained from a reading of the specification and appended claims in conjunction with the drawings, wherein:

DETAILED DESCRIPTION

Figure 1:
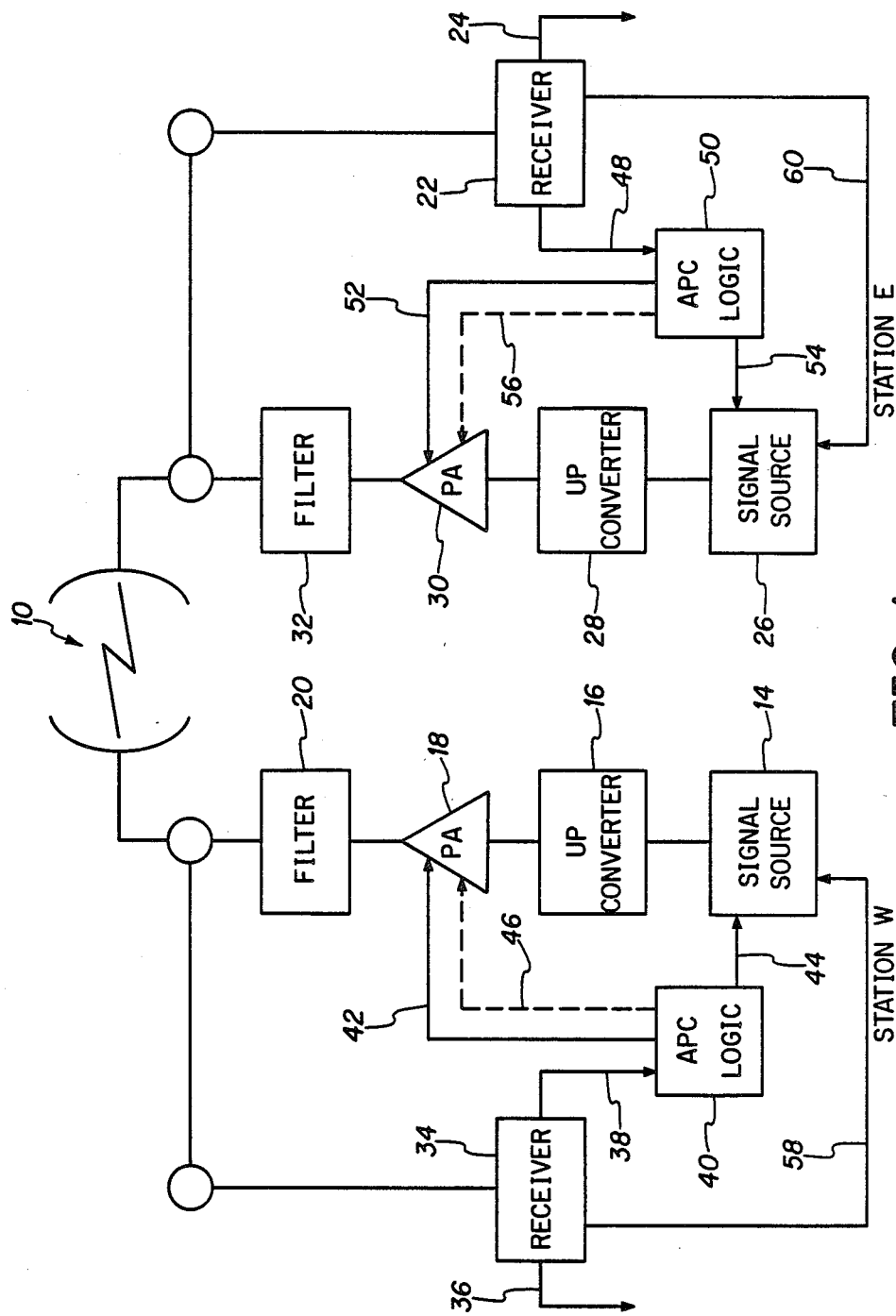
FIG. 1 is a block diagram of a communication system using automatic power control.

In FIG. 1, a communication link, generally illustrated as 10, comprises a signal transmission medium between transmitter and receiver stations, such as shown on the left and righthand side of FIG. 1. While this medium would typically be radio transmission through air and would often, for purposes of products provided by assignee, be a microwave communication link for telephone type signals, the transmission medium could be wires, lightwaves, etc. For the purposes of the invention, the concept may well be applied to a single communication channel between two individuals, as opposed to multichannel operation. A source of one or more signals to be transmitted (i.e., a data signal source) on the lefthand side is designated as 14. This provides signals through an up-converter 16 for changing frequency from signal source to a transmittable frequency. These signals are amplified in a power amplifier 18 and passed through a filter 20 to the medium 10. These signals are then received by a receiver 22 on the righthand side of FIG. 1, and delivered via an output 24 to the appropriate data sinks. Return signals from the system on the righthand side are supplied from a signal source block 26 (similar to source 14) through an up-converter 28, a power amplifier 30, and a filter 32 to the communication link 10, are received by a receiver 34 on the lefthand side and supplied to the system from which signal source 14 derives its signals via a lead 36. When the lefthand side ascertains from the overhead bits in the received signal that a fading condition has occurred, it provides an output signal on a lead 38 to an automatic power control logic block 40, which via a lead 42 changes the bias level within amplifier 18. The change in bias level which will also change the magnitude of the output signal power level. Typically, the amplitude of the signal being supplied to the amplifier 18 from signal source 14 can also be changed to compensate for the fading loss by a signal supplied on lead 44. Optionally, the change in gain or level of the signal being amplified can be accomplished via dash line lead 46 also supplied to amplifier 18. A similar set of operations exist on the righthand station with respect to automatic power control logic block 50 and its associated leads 48, 52, 54 and optional lead 56.

The appropriate receiver such as 34 or 22 detecting a fading condition (the power level of the received signal is too low) provides a notification to the signal source such as by leads 58 or 60 to insert overhead bits into the signal to cause the appropriate remote power amplifier to change its bias level and thus, increase the output signal linearity and if appropriate, the power level.

Figure 2:
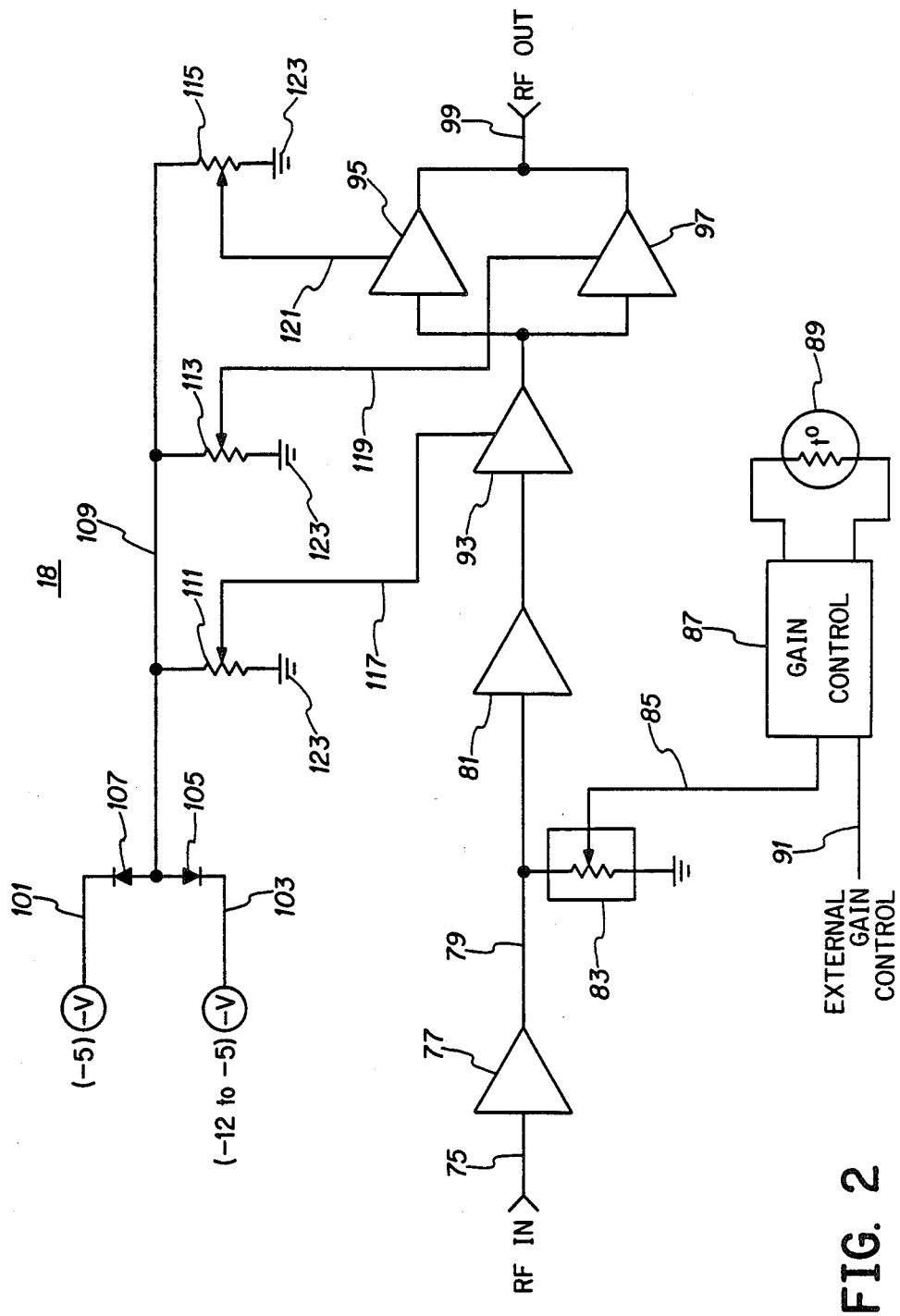
FIG. 2 is a block diagram of a power amplifier for use in the transmitter portion of each of the transmitter receiver portions of FIG. 1.

In FIG. 2, a power amplifier, such as shown in block 18 of FIG. 1, is illustrated having an input lead 75 supplying signals to a first power amplifier 77 which provides output signals on a lead 79 to a further amplifier stage 81. A PIN diode is represented in a block 83 as providing the same effect as a variable impedance to ground via a control signal from a lead 85 connected to a gain control block 87. Gain control block 87 is affected both by the temperature of a thermistor 89 and a control input 91. Control input 91 would correspond to the dash line control lead 46 of FIG. 1. An output of power stage 81 is supplied to an amplifier stage 93 which provides its outputs to a pair of amplifier stages 95 and 97. These stages provide a balanced output. The outputs of amplifiers 95 and 97 are recombined and provided as an output on a lead 99. Bias for these amplifier stages 93 through 97 is provided from a power source comprising a −5 volt power supply source 101 and a variable power supply source 103 which while variable from −12 to −5 volts in one embodiment of the invention would typically be at −9 volts. A pair of diodes 105 and 107 are shown connected between the power supplies 103 and 101, respectively, and connected to a common lead 109. A set of potentiometers 111, 113 and 115 are adjusted to appropriate values and the output wipers are connected respectively via leads 117, 119 and 121 to the amplifiers 93, 97 and 95. The other end of each of the potentiometer windings are connected to ground 123.

Figure 3:
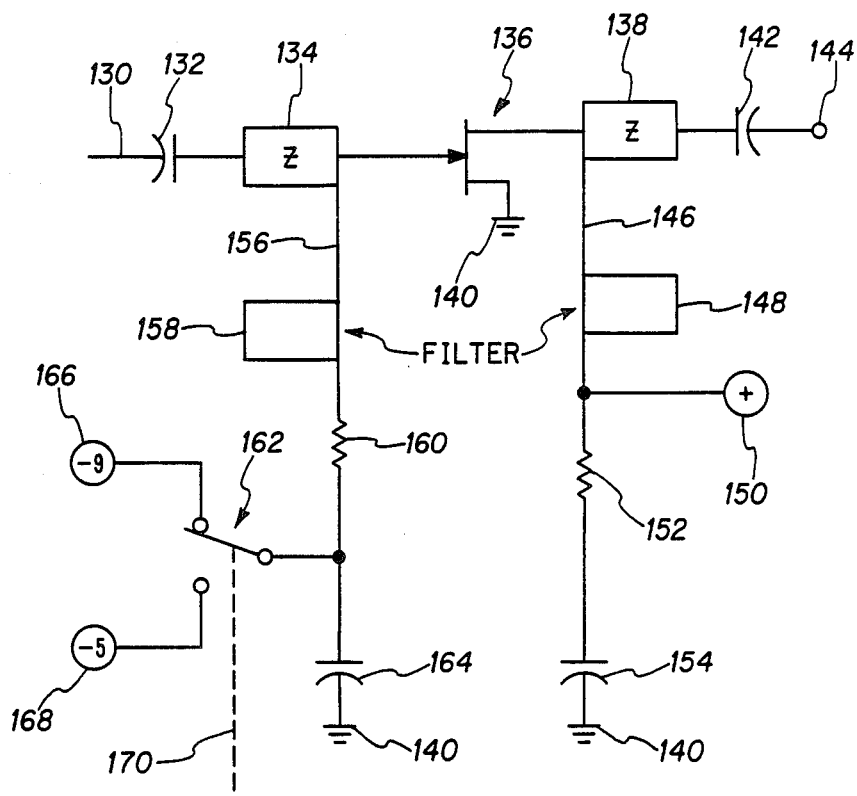
FIG. 3 is a schematic diagram representative of a typical amplifier stage found within FIG. 2.

In FIG. 3, a stage which in one embodiment of the invention represents that contained within amplifier stage 93 of FIG. 2 is shown having an input signal provided to a lead 130. Signals are supplied through a capacitive element 132 to a block 134 representing a microstrip line providing an impedance matching function. An output of block 134 is supplied to an FET generally designated as 136, having a drain connected to a further microstrip element 138 also providing an impedance matching function and a source connected to ground 140. Microstrip element 138 is connected through a capacitive element 142 to an output 144. The microstrip element 138 is operatively connected via a lead 146 to a quarter wavelength stub or filtering element 148 and from there to a positive power source 150. Positive power source 150 is also connected through a resistive element 152 and a capacitive element 154 to ground 140. The previously mentioned microstrip line 134 is operatively connected via a lead 156 to a quarter wavelength stub or filtering means 158 and thence through a resistive element 160 to position switching element 162. The resistive element 160 is also connected through a capacitive element 164 to ground 140. As shown, the switchable element of switch 162 is connected to a −9 volt power supply terminal 166 and can be altered to connect to a −5 volt power supply element 168. The switching action is denoted schematically by a dash line 170. An actual implementation of switch 162 would be solid state. However, the switch is shown as a mechanical element for ease of illustration.

Figure 4:
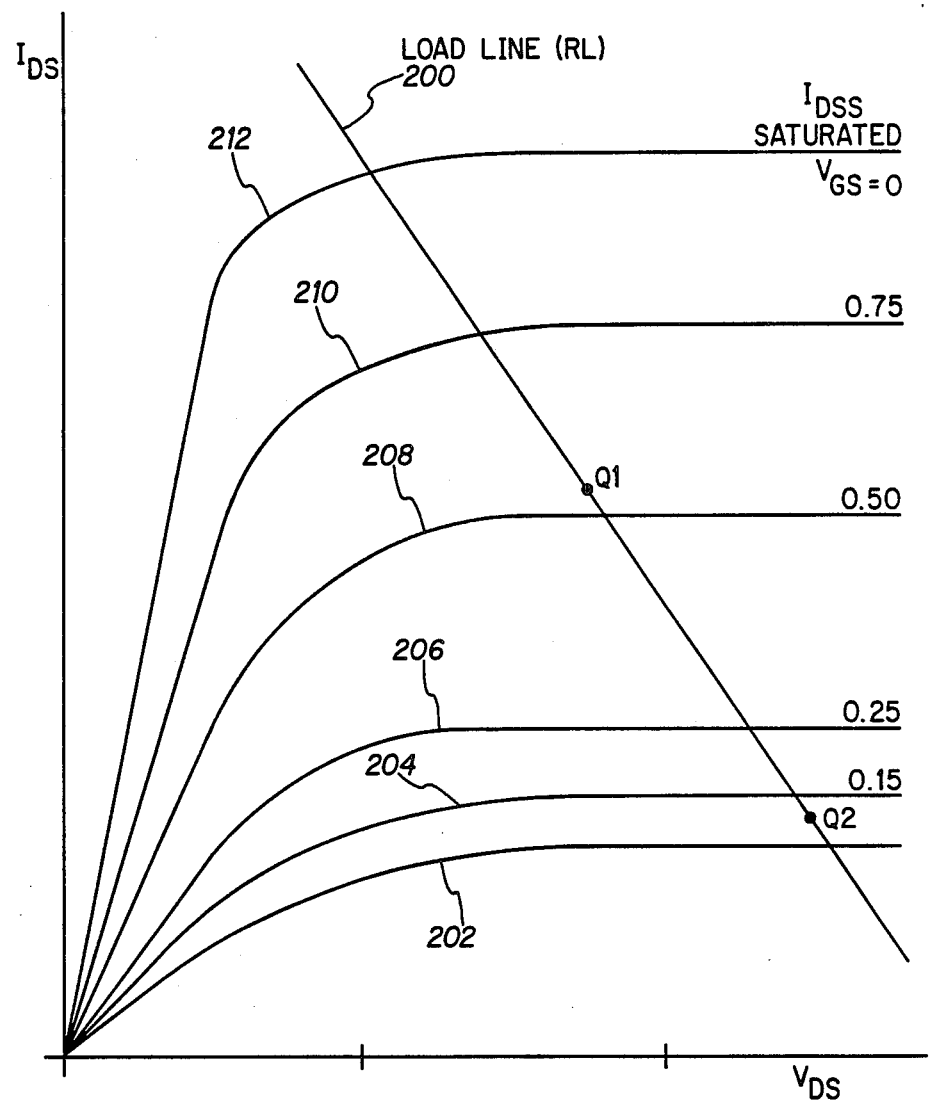
FIG. 4 is a I-V curve of an active element in an amplifier stage, such as an FET.

FIG. 4 comprises a series of curves showing the current from drain to source versus the relative voltage from drain to source for each of a plurality of currents from the gate to the source lead. The drain source current is shown on the vertical axis while the drain source voltage is shown on the horizontal axis. A load line is represented by 200 and a plurality of bias currents are shown as 202, 204, 206, 208, 210 and 212. On the load line 200, are shown two representative bias points Q1 and Q2, with Q1 providing a reasonably linear change of drain source current with a change in current through the gate or bias voltage applied to the gate. Bias point Q2 illustrates a point in the curve wherein the incremental change of load current would be non-linear. The curves in both FIGS. 4 and 5 have been exaggerated for the purposes of illustration and the actual distortion usable in this invention would be much less than that illustrated.

FIG. 5a illustrates an input signal to be amplified, FIG. 5b illustrates an output signal obtained from the circuit of FIG. 3 under the Q1 bias conditions, whereas FIG. 5c illustrates the output signal obtained from FIG. 3 under the bias conditions represented by Q2.

OPERATION

The set of curves in FIG. 4 is representative of the current from source to drain in an FET for a range of voltages from source to drain for each of a plurality of gate to source currents. This is the type of curve used by design engineers to design amplifier stages. In referring to FIG. 3, it will be noted that there is a positive power supply 150, which would set the maximum voltage along the horizontal axis of FIG. 4. The maximum current would be ascertained by dividing the voltage of the source 150 by the series resistances between 150 and ground 140. These two points would establish the load line 200 of curve 4.

In the typical design of an amplifier stage in the prior art, a quiescent setting is utilized, so that signal variations to the gate provide equal amplitude excursions of current through the load resistors for equal increments of positive and negative signal on either side of the quiescent or no-signal condition. Thus, the typical prior art approach would be to use a quiescent current such as that designated by Q1 in FIG. 4. As will be observed, the gate current curves are spaced for substantially equal incremental differences in gate current. It will be observed, however, that the current from source to drain is relatively high. If a quiescent current such as Q2 were used, the current from the source 150 would be considerably less. However, due to the unequal incremental changes around the point Q2, there would be some distortion in the output signal, since input signal variations of a given amount above and below the value Q2 would not provide equal incremental changes in the load current.

Figure 5:
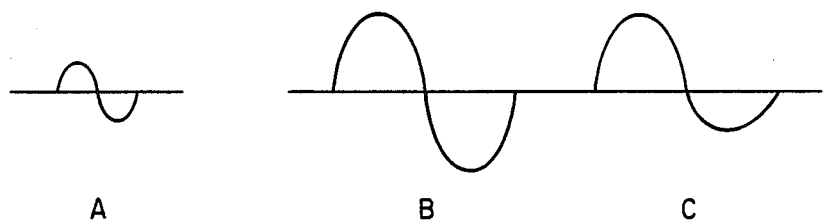
FIGS. 5a, 5b and 5c, comprise a set of waveforms for use in explaining the operation of the amplifier stages illustrated in FIGS. 2 and 3.

As previously mentioned, the input signal is represented in FIG. 5 by waveform 5a whereas the output signal at terminal 144 of FIG. 3 is represented by FIG. 5b for quiescent point Q1, and by 5c for quiescent point Q2. As also previously mentioned, the waveform 5c is considerably distorted for ease of illustration, and typically the quiescent points would be chosen so that there would not be as much distortion as illustrated, and yet would provide considerable power consumption savings.

The circuit of FIG. 3 is substantially the circuit used in amplifier stage 93 of FIG. 2 in one embodiment of the inventive concept. Similar circuits were used in stages 95 and 97. Thus, three stages of the amplifier enjoyed considerable power savings when operated in the Q2 mode or, in other words, when switch 162 was such that power supply 168 was connected to bias the FET 136 of FIG. 3. When switch 162 is operated to the opposite condition, so that bias is supplied by source 166, the Q1 quiescent current condition is activated and the output power is increased as is the linearity, since the distortion is substantially eliminated in this biasing condition. In one embodiment of the invention, the power consumption was reduced 40% by changing the bias of the three stages illustrated in FIG. 2. A further side effect of reducing the bias level in addition to some additional distortion, is that the power output o the amplifier will drop. In the embodiment, as mentioned before, where the power consumption was reduced by 40%, the power output by the amplifier, was reduced by 20%. In some applications of the invention, it may be desirable to compensate for this power reduction by increasing the amplitude of the signal supplied to amplifier 77, or changing the gain of the amplified signal by supplying a signal to an external gain control, such as 91 in FIG. 2. If either the input signal to amplifier 77 is increased by 20% or a signal supplied to gain control 91 to increase the amplification through the amplifier of FIG. 2 by 20% when the bias is reduced, then the power output is maintained while merely having an increase in distortion of the output signal while still maintaining the advantage of reduced power consumption.

On the other hand, since the receiver is requesting a change in bias level from Q2 to Q1 due to fading, it may be desirable to increase the power at the same time that the bias is changed and thus, not provide any signals to the amplifier or the signal source to reduce the power output amplitude.

In order to have a fail safe condition, it may further be desirable to use overhead bits to continually tell the remote site to keep the power reduced and to keep the bias at the Q2 bias condition. Then, if there is a lapse in such a signal, the remote site would automatically increase the power. This would eliminate the possibility that the fading is so severe that no overhead bits are received to request the bias and/or power change.

FIG. 1 combines the various elements in a communication system so that normally each of many channels of signal are supplied across the communication medium 10. If these signals are all transmitted under normal or non-fading conditions at a lower power level, there will be minimal channel interference of signals. When fading conditions occur, the receivers 34 and 22 will provide an output on 56 and 58 to the appropriate transmitter signal sources to transmit a signal via the service channel or overhead bits to the remote transmitter to increase the bias level of the stages to reduce the distortion and increase the output power. If desired, the gain of the amplifier may be reduced to prevent overdriving, but this reduction in gain or reduction in input signal as applied to amplifier 77 need not occur if system design can accommodate same. In any event, the remote receiver will receive the overhead bits and transmit this information to the appropriate power amplifier via the leads, such as 38 and 48, to change the bias and optionally change the gain of the appropriate components to provide an appropriate power output level with appropriately less signal distortion.

In summary, the present invention utilizes the realization that considerable power consumption efficiencies can be realized by operating one or more stages of a power amplifier in a low bias condition, when some distortion is permissible in the operation of the amplifier. When a low distortion signal is required, the bias can be changed to produce a substantially distortion free signal. With the change or increase in bias, the power output of the amplifier is also increased unless appropriate precautions are taken to reduce this power. Some embodiments of the invention may utilize this increased power unchanged. The advantage to the lower power output under normal or non-adverse conditions is that the temperature produced within the amplifier enclosure is lower due to less heat dissipation and this increases the component life, and accordingly, the reliability of the amplifier. In a communication environment, the lower output power under normal conditions produces the advantage of a lower interference between signal channels and reduces power consumption where one or more stages of a communications system may be in remote areas, and power costs are high. Thus, it is of a significant advantage to operate under lower power consumption conditions where there is no fading in the signal being transmitted and, accordingly, the receiver can tolerate some non-linearities in the received signal. The system will then change to a more linear signal, and tolerate the higher power consumption during fading conditions when low distortion of the receive signal is of prime importance.

As also mentioned previously, the present concept can be applied to the situation where the bias can be increased from the optimum bias point to provide a greater power output from the amplifier than normal with an accompanying decrease in linearity of the output signal.

Further, there may be situations where an amplifier may be operated in any of the three different modes depending upon the power and linearity required. The system incorporating the invention as presently disclosed, may in some transmission applications use all three bias conditions advantageously.

Although a single embodiment of the inventive concept has been disclosed, we wish to include all alterations to the specific embodiment included by the invention as claimed in the appended claims, wherein we claim.

We claim:

1. The method of decreasing the power consumption of a transmitter-receiver radio communication system having a supervisory channel comprising the steps of:
   reducing the bias level of at least one of the output amplifier stages in the transmitter portion below the optimum linearity design value whereby distorted signals are transmitted at given reduced power levels under normal conditions;
   detecting the power level of received signals at the receiver poerion of the communication system;
   returning a supervisory request for additional power from the receiver portion to the transmitter portion of the system when the power level of the received signal falls below a predetermined value; and
   dynamically increasing the bias level of said at least one output amplifier stages whereby signals are transmitted above said given power levels, in accordance with and upon receipt of said request for additional power.

2. Apparatus for decreasing the power consumption in a transmitter-receiver radio communication system having a supervisory channel comprising, in combination:
   first and second communication means each including a transmitter means and a receiver means;
   third means, comprising part of each of said transmitter means, for reducing the bias level of at least one of the output amplifier stages in the transmitter portion below the optimum linearity design value whereby distorted signals are transmitted at given reduced power levels under normal conditions;

fourth means, comprising a part of each of said receiver means, for detecting the integrity of received signals at the receiver portion of the communication system;

fifth means, connected to said fourth means, for returning a supervisory request for additional power from the receiver portion of one of said communication means to the transmitter portion of the other of said communication means when the error rate of the received signal falls below a predetermined value; and sixth means, connected to each of said transmitter means, for increasing the bias level of said at least one output amplifier stages whereby signals are transmitted above said given power levels, in accordance upon receipt of said request for additional power.

* * * * *